United States Patent [19]
Grubbs et al.

[11] Patent Number: 5,328,285
[45] Date of Patent: Jul. 12, 1994

[54] ARTICULATED GEAR SHIFT LEVER JOINT ASSEMBLY

[76] Inventors: Gary L. Grubbs; Sheila A. Grubbs, both of 104 S. First St., Canton, Kans. 67428; Delores Grubbs, 1312 S. Chestnut, McPherson, Kans. 67460

[21] Appl. No.: 953,497

[22] Filed: Sep. 29, 1992

[51] Int. Cl.$^5$ .............................................. G05G 9/00
[52] U.S. Cl. ...................................... 403/66; 74/524; 74/473 P
[58] Field of Search ................. 74/524, 473 P; 403/66

[56] References Cited

U.S. PATENT DOCUMENTS

| | | | |
|---|---|---|---|
| 812,198 | 2/1906 | Gessert | 74/524 X |
| 1,156,272 | 10/1915 | Cass | 74/524 |
| 1,283,852 | 11/1918 | Mellin | 74/524 |
| 1,301,475 | 4/1919 | Mellin | 74/524 |
| 1,364,578 | 1/1921 | Nelson | 74/524 |
| 1,719,368 | 7/1929 | Hibbets | 74/524 |
| 1,743,241 | 1/1930 | Schmidt | 74/524 |
| 1,908,423 | 5/1933 | Hjermstad | 74/524 |
| 4,073,199 | 2/1978 | Simons | 74/473 R |
| 4,281,526 | 8/1981 | Lipschutz | 70/202 |
| 4,823,635 | 4/1989 | Selby | 74/524 |
| 4,981,047 | 1/1991 | Denda et al. | 74/524 X |

FOREIGN PATENT DOCUMENTS

0286957  11/1990  Japan ..................... 74/524

*Primary Examiner*—Eric K. Nicholson
*Assistant Examiner*—Christopher J. Novosad
*Attorney, Agent, or Firm*—John R. Flanagan

[57] ABSTRACT

An articulated joint assembly includes an upper joint member having an inner portion and an outer portion connected to an upper lever section of a gear shift lever, a lower joint member having an inner portion and an outer portion connected to a lower lever section of the shift lever, a pivotal joint formed between the inner portions of the upper and lower joint members, and an annular collar having a central bore being slidably mounted over the inner portions of the upper and lower joint members and movable along the inner portions and between the outer portions of the upper and lower joint members between a lower position in which the annular collar locks the upper and lower lever sections at an erected condition and an upper position in which the annular collar unlocks the upper and lower lever sections for converting the shift lever from the erected condition to a folded condition. Flexible resilient annular rings are mounted in annular channels defined in upper and lower ends of the annular collar about the central bore to provide a tight sliding fit between the annular collar and upper and lower joint members as the annular collar is slidably moved between the upper and lower positions. Boots of axially expandable and retractable flexible material are mounted to extend between opposite ends of the annular collar and outer portions of the upper and lower joint members for enclosing the inner portions of the upper and joint members to prevent dust infiltration.

19 Claims, 4 Drawing Sheets

ARTICULATED GEAR SHIFT LEVER JOINT ASSEMBLY

BACKGROUND OF THE INVENTION

1. Field of the Invention

The present invention generally relates to a gear shift lever and, more particularly, is concerned with an articulated joint assembly for incorporation in a shift lever to permit adjustment of the shift lever in order to reduce its height during periods of non-use.

2. Description of the Prior Art

Many motor vehicles, such as truck tractors and the like having sleeper cabs, typically utilize a gear shift lever which is positioned on the floor of the vehicle in the space between the driver and passenger's side of the cab. It is well known that the shift lever often prevents convenient use of this space for moving about the cab or for moving from the seat to a bunk in the cab. The placement of the shift lever is ordinarily dictated by its functional connection to a transmission mechanism to be shifted and the position of the driver in the cab of the vehicle.

Different gear shift lever constructions have been proposed in the prior patent art to provide a way to move the lever out of the way or to remove it for anti-theft purposes. Representative of the prior patent art are the constructions illustrated and described in U.S. Pat. Nos. to Cass (1,156,272), Mellin (1,283,852 and 1,301,475), Nelson (1,364,578), Hibbets (1,719,368), Schmidt (1,743,241), Hjermstad (1,908,423), Simons (4,073,199), Lipschutz (4,281,526) and Selby (4,823,635). The construction of the shift lever of each of these patents may function satisfactorily under the limited range of conditions for which it was designed. However, it is perceived by the inventors of the present invention that none of these constructions are satisfactory in terms of the performance requirements of functionality, strength, durability, reliability, and the ease with which they can be installed into existing shift levers.

Consequently, a need still exists for a shift lever construction which will permit adjustable movement of the shift lever to an out-of-the-way position during non-use.

SUMMARY OF THE INVENTION

The present invention provides an articulated gear shift lever joint assembly which is designed to meet the aforementioned performance requirements and to satisfy the aforementioned need. The articulated joint assembly of the present invention can be interposed in a new or existing gear shift lever so as to adapt an upper section of the shift lever to be interconnected with and pivoted relative to a lower section of the shift lever from an erected condition to a folded condition for decreasing the height and thereby the space occupied by the shift lever when the shift lever is not in use.

Accordingly, the present invention is directed to an articulated joint assembly for connecting between upper and lower lever sections of a gear shift lever. The articulated joint assembly basically includes an upper joint member having an inner portion and an outer portion connected to the upper lever section, a lower joint member having an inner portion and an outer portion connected to the lower lever section, a pivotal joint formed between the inner portions of the upper and lower joint members, and an annular collar having a central bore being slidably mounted over the inner portions of the upper and lower joint members and movable along the inner portions and between the outer portions of the upper and lower joint members between a lower locking position in which the annular collar locks the upper and lower lever sections at the erected condition and an upper unlocking position in which the annular collar unlocks and releases the upper and lower lever sections for converting the shift lever from the erected condition to the folded condition.

The joint assembly also includes flexible resilient annular O-rings mounted in annular channels defined in upper and lower ends of the annular collar about the central bore for engaging the inner portions of the upper and lower joint members to provide a noise-free tight sliding fit between the annular collar and upper and lower joint members as the annular collar is slidably moved between the upper and lower positions. Further, the joint assembly includes bellows-like dust boots of axially expandable and retractable flexible material mounted to extend between opposite ends of the annular collar and the outer portions of the upper and lower joint members for enclosing the inner portions of the upper and lower joint members to prevent dust infiltration.

Additionally, the joint assembly can include a tubular extension member having a hollow interior adapting the extension member to be inserted over the upper joint member and the annular collar. The annular collar and one end of the tubular extension member have complementary matable annular attaching means defined thereon for securely attaching the tubular extension member to the annular collar. The tubular extension member also has a hand grip defined on an opposite end for gripping by a user to lift the annular collar from the locking to unlocking position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figures 1, 4, 5:
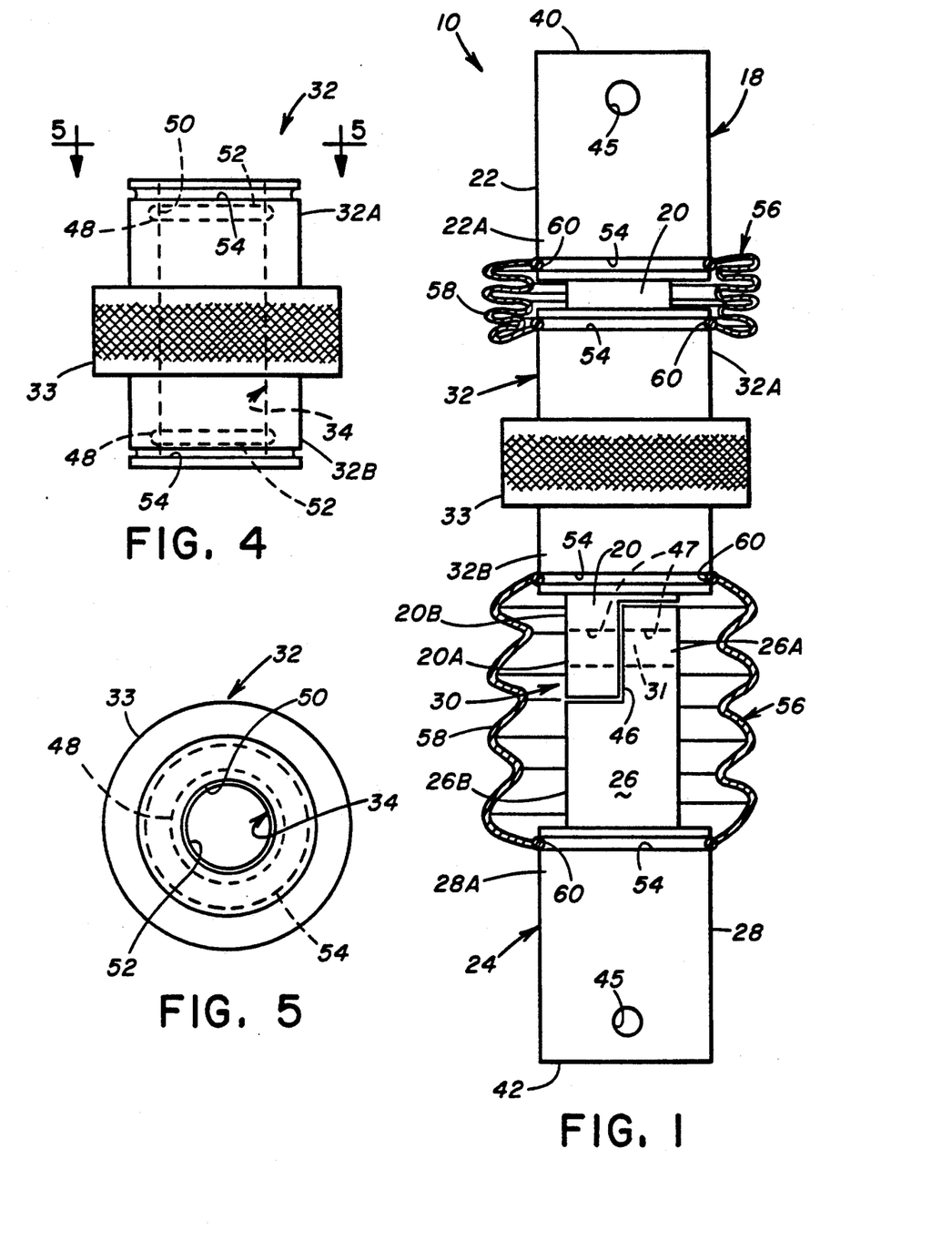
FIG. 1 is an enlarged side elevational view of the articulated joint assembly of the present invention by itself.
FIG. 4 is a side elevational view of an annular collar of the assembly of FIG. 1.
FIG. 5 is an end view of the annular collar of the assembly as seen along line 5—5 of FIG. 4.
Figure 2:
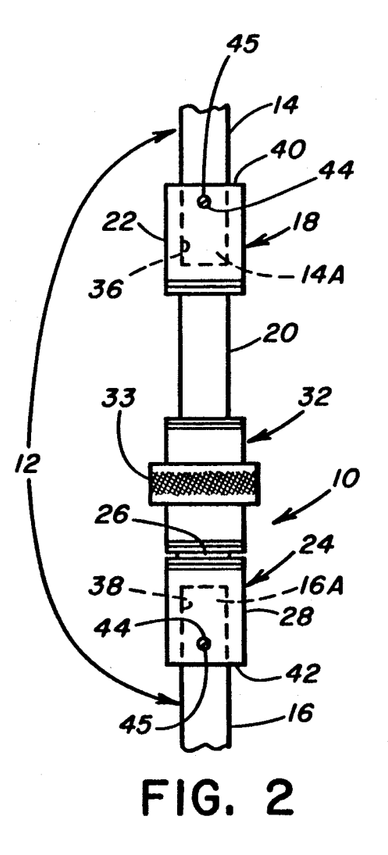
FIG. 2 is a side elevational view of an articulated joint assembly of the present invention incorporated in a conventional gear shift lever, showing the gear shift in an erected condition.
Figure 3:
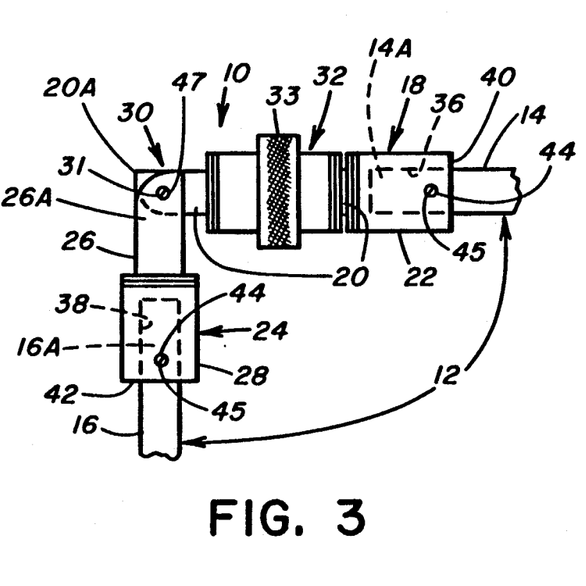
FIG. 3 is a view similar to FIG. 2, but showing the gear shift in a folded position.
Figure 6:
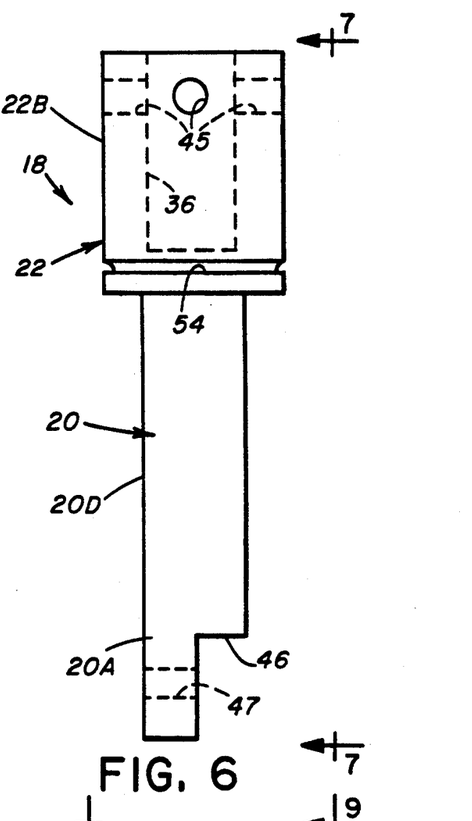
FIG. 6 is a side elevational view of an upper joint member of the assembly of FIG. 1.
Figures 7, 11:
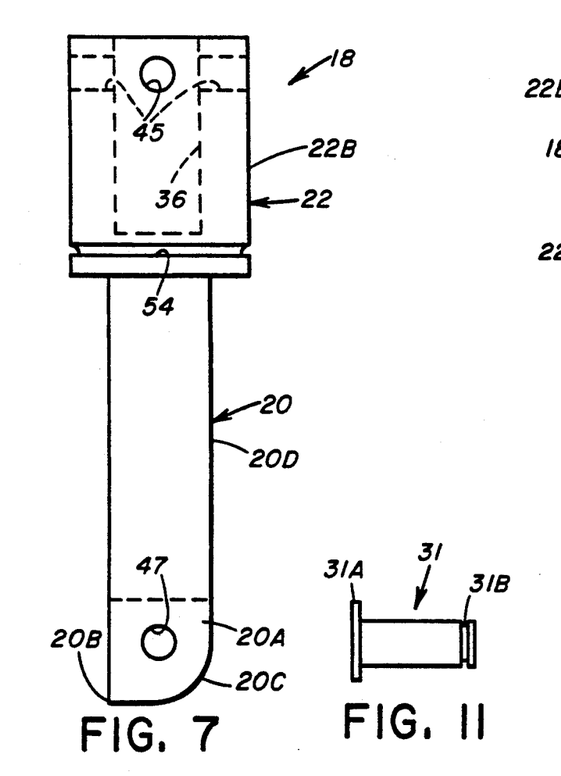
FIG. 7 is another side elevational view of the upper joint member of the assembly as seen along line 7—7 of FIG. 6.
FIG. 11 is a side elevational view of a pivot pin of the assembly of FIG. 1.
Figures 8, 9, 10:
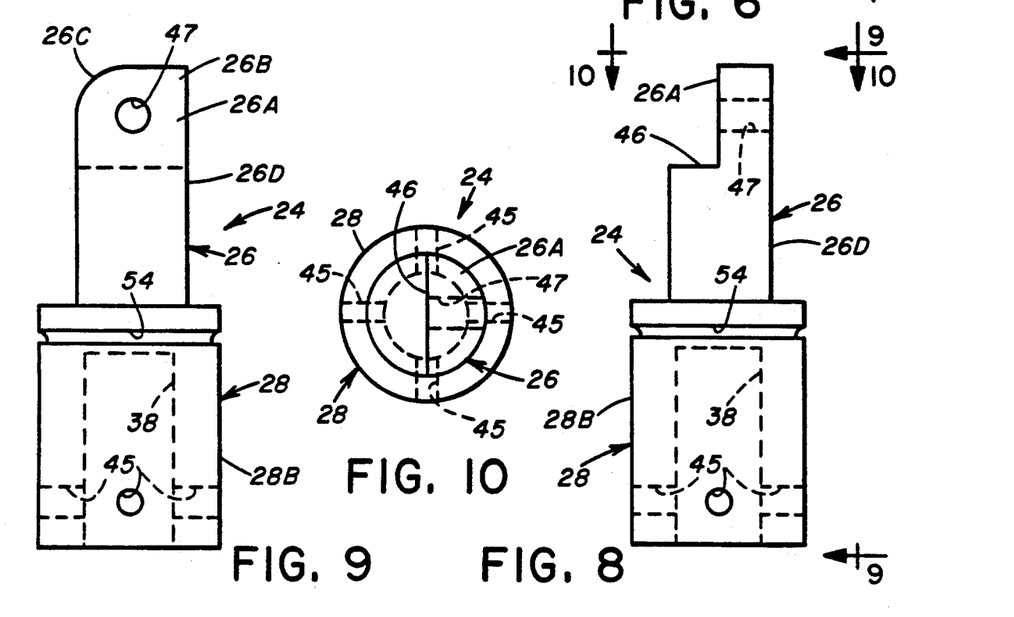
FIG. 8 is a side elevational view of a lower joint member of the assembly of FIG. 1.
FIG. 9 is another side elevational view of the lower joint member of the assembly as seen along line 9—9 of FIG. 8.
FIG. 10 is an end view of the lower joint member of the assembly as seen along line 10—10 of FIG. 8.

Referring to the drawings, and particularly to FIGS. 1-3, there is illustrated an articulated joint assembly, generally designated 10, of the present invention for incorporation in a conventional gear shift lever 12. The articulated joint assembly 10 is adapted to interconnect an upper lever section 14 and a lower lever section 16 of the gear shift lever 12. The joint assembly 10 is operable for converting the upper lever section 14 relative to the lower lever section 16 between an erected condition, as shown in FIG. 2, and a folded condition, as shown in FIG. 3, for decreasing the normal height of the shift lever 12.

Referring to FIGS. 1 and 4-11, the articulated joint assembly 10 basically includes an upper joint member 18 having an inner portion 20 and an outer portion 22 adapted for connection to the upper lever section 14, a lower joint member 24 having an inner portion 26 and an outer portion 28 adapted for connection to the lower lever section 16, a pivotal joint 30 formed between the inner portions 20, 26 of the upper and lower joint members 18, 24, and an annular collar 32 having a central bore 34 adapting the annular collar 32 to be slidably mounted over the inner portions 20, 26 of the upper and lower joint members 18, 24. The annular collar 32 includes a raised middle annular portion 33 with a knurled exterior surface for gripping to move the annular collar 32 along the inner portions 20, 26 between and relative to the outer portions 22, 28 of the upper and lower joint members 18, 24 between a lower position, as seen in FIG. 2, in which the annular collar 32 locks the upper and lower lever sections 14, 16 at the erected condition of FIG. 2 and an upper position, as seen in FIG. 3, in which the annular collar 32 unlocks and releases the upper and lower lever sections 14, 16 for converting the shift lever 12 from the erected condition of FIG. 2 to the folded condition of FIG. 3.

Referring to FIGS. 1 and 6-9, the inner portions 20, 26 of the upper and lower joint members 18, 24 have circular cross-sectional sizes substantially identical to one another and thus have substantially equal outside diameters. The cross-sectional sizes (and thus outside diameters) of the inner portions 20, 26 are smaller than the cross-sectional sizes (and thus outside diameters) of the outer portions 22, 28 of the upper and lower joint members 18, 24. The outside diameters of the outer portions 22, 28 have circular cross-sectional sizes substantially identical to one another and thus have substantially equal outside diameters. The central bore 34 of the annular collar 32 is larger in cross-sectional size (and thus inside diameter) than the cross-sectional size (and thus outside diameter) of the inner portions 20, 26 of the upper and lower joint members 18, 24 but is smaller in cross-sectional size (and thus inside diameter) than the cross-sectional size (and thus outside diameter) of the outer portions 22, 28 of the upper and lower joint members 18, 24. Therefore, the slidable movement of the annular collar 32 along the inner portions 20, 26 of the upper and lower joint members 18, 24 is limited by engagement of the opposite upper and lower ends 32A, 32B of the annular collar 32 respectively with the inner ends 22A, 28A of the outer portions 22, 28 of the upper and lower joint members 18, 24 upon reaching the unlocking and locking positions, respectively of FIGS. 3 and 2. At the lower locking position of FIG. 2, the annular collar 32 overlaps and fully conceals the pivotal joint 30 and thus keeps the joint 30 from articulating. In this position, the two inner portions 20, 26 of the upper and lower joint members 18, 24, in effect, provide a rigid shaft. When the annular collar 32 is lifted up to the upper unlocking position of FIG. 3, the pivotal joint 30 is exposed enough to allow the joint 30 to articulate.

Referring to FIGS. 1-3, the outer portions 22, 28 of the upper and lower joint members 18, 24 are respectively releasably attached to the upper and lower lever sections 14, 16 of the shift lever 12. The outer portions 22, 28 of the upper and lower joint members 18, 24 include respective central recesses 36, 38 extending from the respective outer surfaces 40, 42 on the outer portions 22, 28 into the outer portions but terminating short of the inner ends 22A, 28A of the outer portions 22, 28. The central recesses 36, 38 receive the ends 14A, 16A of the upper and lower lever sections 14, 16. The outer portions 22, 28 also include means in the form of threaded set screws 44 and tapped holes 45 formed through the outer portions 22, 28 from their external cylindrical surfaces 22B, 28B to their central recesses 36, 38. The set screws 44 are threaded into the tapped holes 45 and the inner ends of the set screws 44 are tightened against the ends 14A,. 16A of the upper and lower lever sections 14, 16 in the respective central recesses 36, 38 so as to rigidly, but releasably, attach the upper and lower lever sections 14, 16 to the upper and lower joint members 18, 24. By way of example, there are four tapped holes 45 formed in each outer portion 22, 28 being spaced circumferentially apart approximately 90° from one another. Likewise, there are four set screws 44 for screwing into the four tapped holes 45 in each of the outer portions 22, 28 of the upper and lower joint members 18, 24.

Referring to FIGS. 1, 3 and 6-11, the pivotal joint 30 is provided between the inner ends 20A, 26A of the inner portions 22, 26 of the upper and lower joint members 18, 24 for pivoting the upper lever section 14 relative to the lower lever section 16 to convert the shift lever 12 between the erected condition of FIG. 2 and the folded condition of FIG. 3. The inner ends 20A, 26A of the inner portions 22, 26 of the upper and lower joint members 18, 24 have complementary cutout regions or notches 46 defined therein which permit the inner ends 20A, 26A to fit together in side-by-side flush relation. The inner ends 20A, 26A also have respective apertures 47 therein which are aligned with one another. The pivot pin 31 is inserted through the apertures 47 to provide the pivotal joint 30. The pivot pin 31 has a flange 31A at one end and receives a snap ring (not shown) insertable in an annular recess 31B about the opposite end for retaining the pivot pin 31 through the apertures 47. The inner ends 20A, 26A also have full right-angled or squared-off corners 20B, 26B which act as stops and having arcuate or rounded-off corners 20C, 26C which permit the upper joint member 18 to pivot in only one direction relative to the lower joint member 24 and through an approximately 90° arc from the erected condition of FIG. 2 to the folded condition of FIG. 3.

Referring to FIGS. 1, 4 and 5, the articulated joint assembly 10 also includes means mounted adjacent opposite upper and lower ends 32A, 32B of the annular collar 32 for engaging the inner portions 20, 26 of the upper and lower joint members 18, 24 so as to provide a substantially rattle- and noise-free tight sliding fit between the annular collar 32 and the upper and lower joint members 18, 24 as the annular collar 32 is slidably moved along the inner portions 20, 26 between the upper unlocking position of FIGS. 1 and 3 and the lower locking position of FIG. 2. The engaging means at the opposite ends 32A, 32B of the annular collar 32 includes a pair of annular channels 48 defined at the opposite upper and lower ends 32A, 32B of the annular collar 32 within a cylindrical surface 50 defining the central bore 34 in the annular collar 32. The annular channels 48 extend about and open into the central bore 34. The engaging means also includes a pair of annular resilient flexible members in the form of O-rings 52 seated in the annular channels 48 and projecting radially inwardly into the central bore 34. The annular flexible O-rings 52 are compressed against and slidably engaged with the exterior cylindrical surfaces 20D, 26D of the inner portions 20, 26 of the upper and lower joint members 18, 24 to provide the substantially noise-free tight sliding fit between the annular collar 32 and the upper and lower joint members 18, 24, as the annular collar 32 is slidably moved between the upper and lower positions.

Referring to FIG. 1, the articulated joint assembly 10 further includes means in the form of annular grooves 54 and a pair of tubular dust boots 56 for fully enclosing the articulated or pivotal joint 30. The annular grooves 54 are defined at and about the opposite ends 32A, 32B of the annular collar 32 and at and about the inner ends 22A, 28A of the outer portions 22, 28 of the upper and lower joint members 18, 24. The tubular boots 56 extend between and interconnect the upper and lower ends 32A, 32B of the annular collar 32 with the inner ends 22A, 28A of the outer portions 22, 28 of the upper and lower joint member 18, 24 for enclosing and protecting the inner portions 20, 26 of the upper and lower joint members 18, 24, as the annular collar is slidably moved therealong. Each tubular boot 56 is an axially expandable and retractable bellowslike sleeve 58 constructed of a suitable flexible material and having a pair of annular bands 60 defined about the opposite ends of the sleeve 58. The annular bands 60 are seated within the annular grooves 54 so as to retain the boots 56 mounted between the annular collar 32 and the outer portions 22, 28 of the upper and lower joint members 18, 24 and prevent the boots 56 from slipping out of place. Therefore, the sleeves 58 of the boots 56 extend between the annular collar 32 and the upper and lower joint members 18, 24 so as to enclose the respective inner portions 20, 26 of the upper and lower joint members 18, 24 for preventing infiltation of dust to the pivotal joint 30 formed by the inner portions of the upper and lower joint members 18, 24, as the annular collar 32 is slibably moved therealong.

Figure 12:
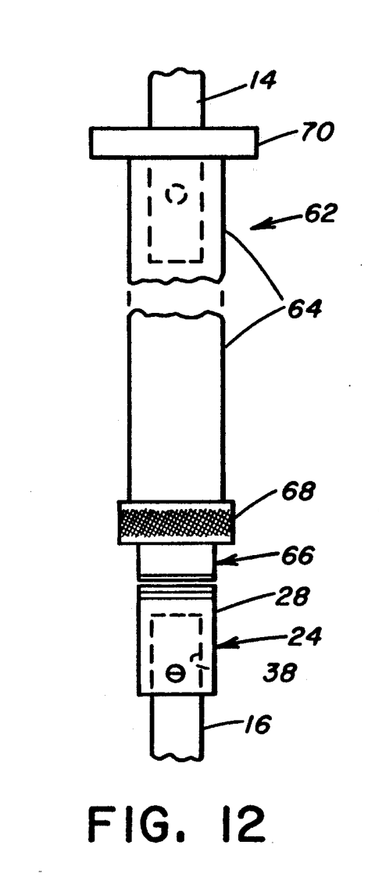
FIG. 12 is a side elevational view of the articulated joint assembly of the present invention employing a modified extension collar subassembly.
Figure 13:
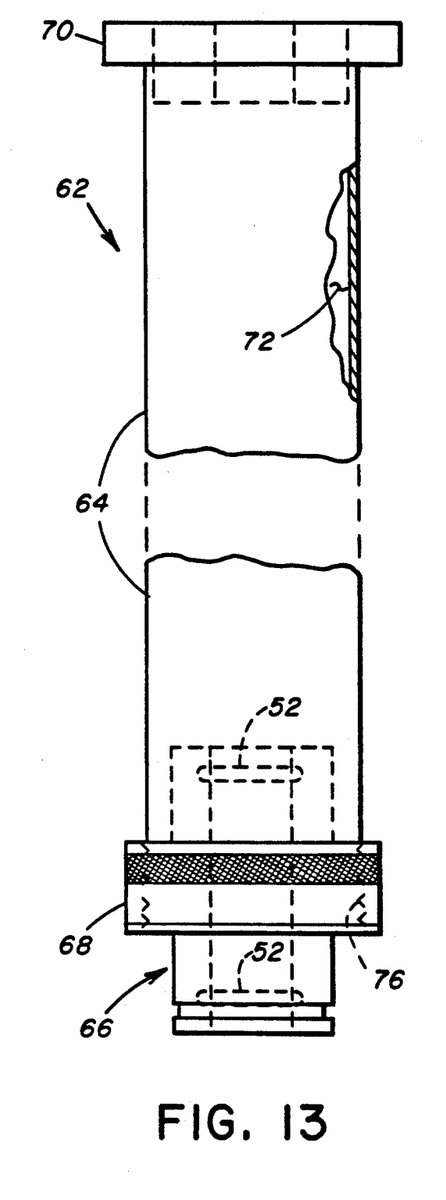
FIG. 13 is an enlarged foreshortened side elevational view of the modified extension collar subassembly by itself.
Figure 14:
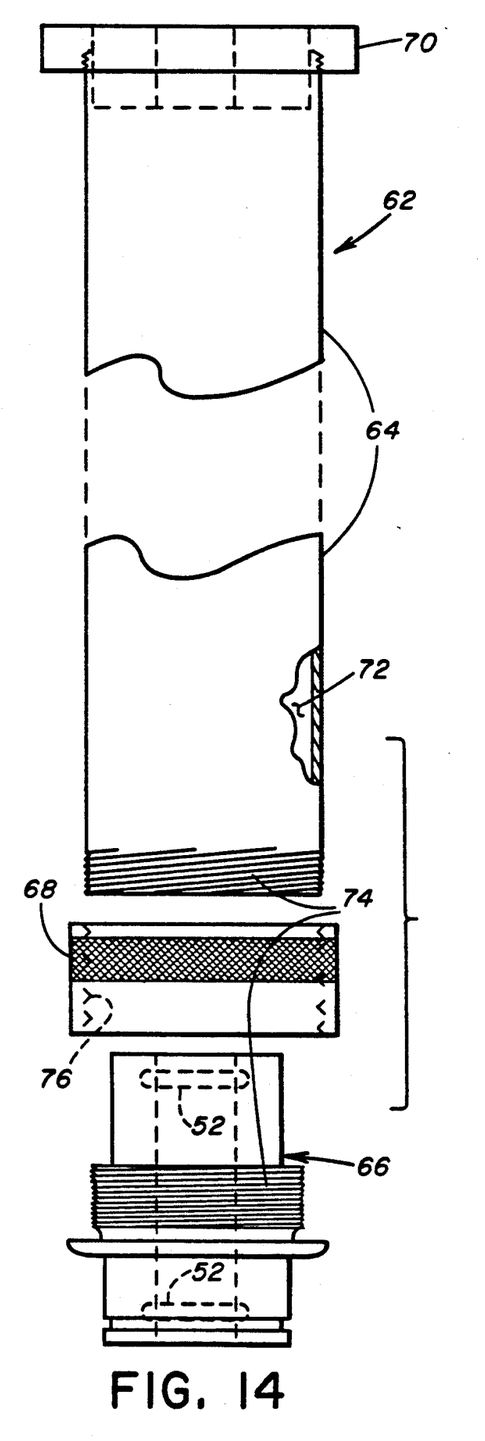
FIG. 14 is a foreshortened exploded elevational view of the modified extension collar subassembly of FIG. 13.

Referring to FIGS. 12-14, the articulated joint assembly 10 can optionally employ a modified extension collar subassembly 62 for making it easier for a user to reach and operate the articulated joint assembly 10. The collar subassembly 62 includes a tubular extension member 64, a modified annular collar 66, an attachment ring 68, and an annular hand grip 70. The tubular extension member 64 has a hollow interior 72 adapting the extension member 64 to be inserted over the upper joint member 18 and the modified annular collar 66. The modified annular collar 66 and one end 64A of the tubular extension member 64 have one set of annular attaching means in the form of external threads 74 formed thereon and the attachment ring 68 has another set of annular attaching means in the form of complementary internal threads 76 formed thereon for inserting the attachment ring 68 over the adjacently positioned external threads 74 for securely attaching the tubular extension member 64 to the modified annular collar 66. The hand grip 70 is attached on the opposite end 64B of the tubular extension member 64 to make it easier to grip by a user in order to lift the modified annular collar 66 from the locking to unlocking position.

Installation of the articulated joint assembly 10 by retrofitting it into a gear shift lever 12 occurs as follows. First, the installer removes the air lines and accessories from the shift lever 12 and places them out of the way. At a desired location on the shift lever 12, the installer cuts the shift lever 12 into the separate upper and lower lever sections 14, 16. The installer has to cut off an additional length from the lower end of the upper lever section 14 so that after the joint assembly 10 is installed, the total height of the shift lever 12 will remain the same as before the joint assembly 10 was installed. Next, installer fits the joint assembly 10 over the lower lever section 16 with the upper end 16A of the lower lever section 16 extending into the central recess 38 in the outer portion 28 of the lower joint member 24 so as to bottom out the upper end 16A in the central recess 38. Then, the installer rotates the joint assembly 10 on the lower lever section 16 to orient it in the proper angular position that will permit the upper lever section 14 to pivot in the desired direction from the erected condition of FIG. 2 to the folded condition of FIG. 3. Once the proper angular position of the joint assembly 10 on the lower lever section 16 has been set, the installer will thread four set screws 44 into the tapped holes 45 in the outer portion 28 of the lower joint member 24, applying approximately 25-30 ft.-lbs. of torque to tighten the screws 44 down into the upper end 16A of the lower lever section 16 until they are firmly bottomed thereon. Next, the installer places the lower end 14A of the upper lever section 14 into the central recess 36 of the outer portion 22 of the upper joint member 18 so as to bottom out the lower end 14A in the central recess 36. Then, the installer threads four set screws 44 into the tapped holes 45 in the outer portion 22 of the upper joint member 18, tightening down the screws 44 into the upper lever section 14 with the application of the same amount of torque. Finally, the installer can reconnect all air lines and accessories back onto the gear shift lever 12.

To use the articulated joint assembly 10, the driver first brings the tractor to a complete stop, for instance, when parking overnight. The driver will reach down and firmly take hold of the grip 33 on the slidable annular collar 32 and slide the collar 32 upward until it makes contact with the upper stop formed by the inner end 20A of the inner portion 20 of the upper joint member 18. Then, the driver can pivot the upper lever section 14 from its vertical operating, erected condition of FIG. 2 to its 90° inoperative, folded condition of FIG. 3.

The upper lever section 14 of the shift lever 12 is now out of the way for the driver to move around in the cab of the truck. To return the shift lever 12 to the erected condition, the driver simply lifts and pivots the upper lever section 18 up to its vertical position and moves the slidable annular collar 32 down until it bottoms against the lower stop formed by the inner end 26A of the inner portion 26 of the lower joint member 24. Now the shift lever 12 is locked in the operating, erected condition.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An articulated joint assembly for connecting between upper and lower lever sections of a gear shift lever, said assembly comprising:
    (a) an upper joint member having adjacent axially-extending inner and outer portions, said outer portion being adapted for connecting to an upper section of a gear shift lever;
    (b) a lower joint member having adjacent axially-extending inner and outer portions, said outer portion being adapted for connecting to a lower section of the gear shift lever;
    (c) means connecting a lower end of said inner portion of said upper joint member and an upper end of inner portion of said lower joint member so as to form a pivotal joint between the upper and lower joint members;
    (d) an annular collar having spaced opposite upper and lower ends and a central bore extending between said opposite ends, said annular collar being mounted over said inner portions of said upper and lower joint members and slidable between said outer portions of said upper and lower joint members for movement between a lower position in which the annular collar locks the shift lever at an erected condition and an upper position in which the annular collar unlocks and releases the shift lever for converting the shift lever from the erected condition to a folded condition; and
    (e) means mounted adjacent opposite upper and lower ends of said annular collar for engaging said inner portions of said upper and lower joint members so as to provide a substantially tight sliding fit between said annular collar and said upper and lower joint members as said annular collar is slidably moved between said upper and lower positions.

2. The joint assembly of claim 1 wherein said engaging means includes:
    a pair of annular channels defined in said opposite upper and lower ends of said annular collar about and opening into said central bore therein; and
    a pair of annular resilient flexible members disposed in said annular channels and projecting into said bore, said annular flexible members being slidably engaged with said inner portions of said upper and lower joint members as said annular collar is slidably moved between said upper and lower positions to provide a substantially tight sliding fit between said annular collar and said upper and lower joint members.

3. The joint assembly of claim 1 wherein:
    said inner portion of said upper joint member is smaller in cross-sectional size than said outer portion thereof;
    said inner portion of said lower joint member is smaller in cross-sectional size than said outer portion thereof.

4. The joint assembly of claim 3 wherein said central bore of said annular collar is larger in cross-sectional size than said cross-sectional sizes of said inner portions of said upper and lower joint members and is smaller in cross-sectional size than said cross-sectional sizes of said outer portions of said upper and lower joint members such that said slidable movement of said annular collar along said inner portions of said upper and lower joint members is limited by engagement of said opposite upper and lower ends of said annular collar respectively with said outer portions of said upper and lower joint members upon reaching said upper and lower positions.

5. The joint assembly of claim 1 wherein said outer portion of said upper joint member includes:
    a central recess formed therein so as to extend from an outer surface thereon into said outer portion for receiving the upper lever section; and
    means for attaching the upper lever section in said central recess of said outer portion of said upper joint member.

6. The joint assembly of claim 1 wherein said outer portion of said lower joint member includes:
    a central recess formed therein so as to extend from an outer surface thereon into said outer portion for receiving the lower lever section; and
    means for attaching the lower lever section in said central recess of said outer portion of said lower joint member.

7. The joint assembly of claim 1 further comprising:
    means disposed at and extending between and interconnecting said upper end of said annular collar and said outer portion of said upper joint member for enclosing said inner portion of said upper joint member as said annular collar is slidably moved therealong; and
    means disposed at and extending between and interconnecting said lower end of said annular collar and said outer portion of said lower joint member for enclosing said inner portion of said lower joint member as said annular collar is slibably moved therealong.

8. The joint assembly of claim 7 wherein said means for enclosing said inner portion of said upper joint member includes:
    a pair of annular grooves defined about said upper end of said annular collar and about a lower end of said outer portion of said upper joint member; and
    a boot of flexible material having a pair of annular bands defined at opposite ends thereof being seated with said annular grooves and an axially expandable and retractable sleeve extending between and connected with said annular bands so as to enclose said inner portion of said upper joint member for preventing infiltation of dust to said inner portion of said upper joint member as said annular collar is slibably moved therealong.

9. The joint assembly of claim 7 wherein said means for enclosing said inner portion of said lower joint member includes:
    a pair of annular grooves defined about said lower end of said annular collar and about an upper end of said outer portion of said lower joint member; and a boot of flexible material having a pair of annular bands defined at opposite ends thereof being seated with said annular grooves and an axially expandable and retractable sleeve extending between and connected with said annular bands so as to enclose said inner portion of said lower joint member for preventing infiltration of dust to said inner portion of said lower joint member as said annular collar is slibably moved therealong.

10. An articulated joint assembly for connecting between upper and lower lever sections of a gear shift lever, said assembly comprising:

(a) an upper joint member having adjacent axially-extending inner and outer portions, said outer portion being adapted for connecting to an upper section of a gear shift lever;

(b) a lower joint member having adjacent axially-extending inner and outer portions, said outer portion being adapted for connecting to a lower section of the gear shift lever;

(c) means for defining a pivotal joint between said inner portions of said upper and lower joint members;

(d) an annular collar having spaced opposite upper and lower ends and a central bore extending between said opposite ends, said annular collar being mounted over said inner portions of said upper and lower joint members and slidable between said outer portions of said upper and lower joint members for movement between a lower position in which the annular collar locks the shift lever at an erected condition and an upper position in which the annular collar unlocks and releases the shift lever for converting the shift lever from the erected condition to a folded condition;

(e) means disposed at and extending between and interconnecting said upper end of said annular collar and said outer portion of said upper joint member for enclosing said inner portion of said upper joint member as said annular collar is slidably moved therealong; and (f) means disposed at and extending between and interconnecting said lower end of said annular collar and said outer portion of said lower joint member for enclosing said inner portion of said lower joint member as said annular collar is slibably moved therealong.

11. The joint assembly of claim 10 wherein said means for enclosing said inner portion of said upper joint member includes:

a pair of annular grooves defined about said upper end of said annular collar and about a lower end of said outer portion of said upper joint member; and a boot of flexible material having a pair of annular bands defined at opposite ends thereof being seated with said annular grooves and an axially expandable and retractable sleeve extending between and connected with said annular bands so as to enclose said inner portion of said upper joint member for preventing infiltration of dust to said inner portion of said upper joint member as said annular collar is slibably moved therealong.

12. The joint assembly of claim 10 wherein means for enclosing said inner portion of said lower joint member includes:

a pair of annular grooves defined about said lower end of said annular collar and about an upper end of said outer portion of said lower joint member; and a boot of flexible material having a pair of annular bands defined at opposite ends thereof being seated with said annular grooves and an axially expandable and retractable sleeve extending between and connected with said annular bands so as to enclose said inner portion of said lower joint member for preventing infiltration of dust to said inner portion of said lower joint member as said annular collar is slibably moved therealong.

13. The joint assembly of claim 10 wherein:

said inner portion of said upper joint member is smaller in cross-sectional size than said outer portion thereof;

said inner portion of said lower joint member is smaller in cross-sectional size than said outer portion thereof.

14. The joint assembly of claim 13 wherein said central bore of said annular collar is larger in cross-section than said cross-sectional sizes of said inner portions of said upper and lower joint members and is smaller in cross-sectional size than said cross-sectional sizes of said outer portions of said upper and lower joint members such that said slidable movement of said annular collar along said inner portions of said upper and lower joint members is limited by engagement of said opposite upper and lower ends of said annular collar respectively with said outer portions of said upper and lower joint members upon reaching said upper and lower positions.

15. The joint assembly of claim 10 wherein said outer portion of said upper joint member includes:

a central recess formed therein so as to extend from an outer surface thereon into said outer portion for receiving the upper lever section; and means for attaching the upper lever section in said central recess of said outer portion of said upper joint member.

16. The joint assembly of claim 10 wherein said outer portion of said lower joint member includes:

a central recess formed therein so as to extend from an outer surface thereon into said outer portion for receiving the lower lever section; and means for attaching the lower lever section in said central recess of said outer portion of said lower joint member.

17. An articulated joint assembly for connecting between upper and lower lever sections of a gear shift lever, said assembly comprising:

(a) an upper joint member having adjacent axially-extending outer and inner portions, said inner portion being smaller in cross-sectional size than said outer portion, said outer portion being adapted for connecting to an upper section of a gear shift lever;

(b) a lower joint member having adjacent axially-extending outer and inner portions, said inner portion being smaller in cross-sectional size than said outer portion, said outer portion being adapted for connecting to a lower section of the gear shift lever;

(c) means connecting a lower end of said inner portion of said upper joint member and an upper end of said inner portion of said lower joint member so as to form a pivotal joint between said upper and lower joint members;

(d) an annular collar having spaced opposite upper and lower ends and a central bore extending between said opposite ends, said bore being larger in cross-sectional size than said cross-sectional sizes of said inner portions of said upper and lower joint members and being smaller in cross-sectional size than said cross-sectional sizes of said outer portions of said upper and lower joint member so as to mount said annular collar over said inner portions of said upper and lower joint members for slidable movement therealong being limited by engagement of said opposite upper and lower ends of said annular collar respectively with said outer portions of said upper and lower joint members upon respectively reaching a lower locking position adjacent to said outer portion of said lower joint member and an upper unlocking position adjacent to said outer portion of said upper joint member, said annular collar in said lower locking position being disposed over said pivotal joint so as to prevent converting of the upper lever section from an erected condition to a folded condition relative to a lower lever section, said annular collar in said upper unlocking position being displaced above said pivotal joint so as to permit converting of the upper lever section from the erected condition to the folded condition relative to the lower lever section;

(e) annular attaching means defined about said annular collar; and (f) a tubular extension member having a hollow interior being larger in cross-sectional size than said annular collar and said outer portion of said upper joint member so as to permit said tubular extension member to be inserted over said annular collar and said outer portion of said upper joint member, said tubular extension member having annular attaching means defined at one end being matable with said annular attaching means on said annular collar for attaching said tubular extension member to said annular collar, said tubular extension member having a hand grip defined at an opposite end thereof.

18. The joint assembly of claim 17 wherein said outer portion of said upper joint member includes:
a central recess formed therein so as to extend from an outer surface thereon into said outer portion for receiving the upper lever section; and
means for attaching the upper lever section in said central recess of said outer portion of said upper joint member.

19. The joint assembly of claim 17 wherein said outer portion of said lower joint member includes:
a central recess formed therein so as to extend from an outer surface thereon into said outer portion for receiving the lower lever section; and
means for attaching the lower lever section in said central recess of said outer portion of said lower joint member.

* * * * *